(12) United States Patent
Benjestorf (10) Patent No.: US 11,626,685 B1
(45) Date of Patent: Apr. 11, 2023

(54) POWER ACTIVATION UTILIZING REED SWITCH TECHNIQUE FOR NON-METALLIC CONNECTOR APPLICATIONS

(71) Applicant: Non-Metallic Connectors, Inc., Harrisburg, PA (US)

(72) Inventor: Joshua S. Benjestorf, Harrisburg, PA (US)

(73) Assignee: NON-METALLIC CONNECTORS, INC., Harrisburg, PA (US)

( * ) Notice: Subject to any disclaimer, the term of this patent is extended or adjusted under 35 U.S.C. 154(b) by 0 days.

(21) Appl. No.: 17/947,501

(22) Filed: Sep. 19, 2022

Related U.S. Application Data (60) Provisional application No. 63/246,468, filed on Sep. 21, 2021.

(51) Int. Cl.
- H01R 13/502 (2006.01)
- H04B 5/00 (2006.01)
(Continued)

(52) U.S. Cl.
CPC ....... *H01R 13/502* (2013.01); *H01H 36/0006* (2013.01); *H01R 13/516* (2013.01);
(Continued)

(58) Field of Classification Search
CPC .... H01R 13/502; H01R 13/516; H01R 24/40; H01H 36/0006; H04B 5/0012; H04B 5/0093
See application file for complete search history.

(56) References Cited

U.S. PATENT DOCUMENTS

| 7,517,222 B2 * | 4/2009 | Rohrbach | H01R 13/6205 439/39 |
| 9,197,292 B2 * | 11/2015 | Benjestorf | H04B 5/0093 |

(Continued)

OTHER PUBLICATIONS

N. Zannat and P. D. Franzon, "Asymmetric Transformer Design With Multiband Frequency Response for Simultaneous Power and Data Transfer," in IEEE Transactions on Components, Packaging and Manufacturing Technology, vol. 10, No. 4, pp. 644-653, Apr. 2020, doi: 10.1109/TCPMT.2020.2977045.

(Continued)

*Primary Examiner* — Peter G Leigh
*Assistant Examiner* — Nader J Alhawamdeh
(74) *Attorney, Agent, or Firm* — Panitch Schwarze Belisario & Nadel LLP (57) ABSTRACT

A supply-side non-metallic contactless electrical power connector includes a housing with a metal-free coupling interface for coupling to a non-metallic load connector. A power supply electrically connects to an external power supply. A contactless electrical power transmitter is disposed within the housing and adjacent to the coupling interface. A reed switch is disposed within the housing and enters an activated state when in proximity to a magnetic field generated by the load connector. The reed switch is in electrical communication with the power supply and the contactless electrical power transmitter such that when the reed switch is activated, the contactless electrical power transmitter is electrically connected to the power supply and is enabled to contactlessly transmit electrical power to the load connector, and when the reed switch is inactivated, the reed switch prevents electrical connection between the power supply and the contactless electrical power transmitter.

30 Claims, 6 Drawing Sheets

(51) Int. Cl.
  H01H 36/00   (2006.01)
  H01R 24/40   (2011.01)
  H01R 13/516  (2006.01)

(52) U.S. Cl.
  CPC .......... H01R 24/40 (2013.01); H04B 5/0012 (2013.01); H04B 5/0093 (2013.01)

(56) References Cited

U.S. PATENT DOCUMENTS 9,634,728 B2 * 4/2017 Hassan-Ali .......... H04B 5/0037
2015/0349847 A1 * 12/2015 Hassan-Ali .......... H04B 5/0037
                                                       455/41.1

OTHER PUBLICATIONS

A. More and B. Taskin, "EM and circuit co-simulation of a reconfigurable hybrid wireless NoC on 2D ICs," 2011 IEEE 29th International Conference on Computer Design (ICCD), 2011, pp. 19-24, doi:10.1109/ICCD.2011.6081370.

Benjestorf, Joshua, "Micro-Wireless Power Transfer with Applications to the Non-Metallic Connector", Master of Science Thesis, The Pennsylvania State University, Aug. 2021.

J. Shuo Liu and J. Lai "Accurate Expressions of Mutual Inductance and Their Calculation of Archimedean Spiral Coils," Energies 2019, 12, 2017, pp. 1-14, doi:10.3390/en12102017.

K. Wang and S. Sanders, "Contactless USB—A Capacitive Power and Bidirectional Data Transfer System," pp. 1342-1347, 978-1-4799-2325-0/14, 2014.

J.S. Benjestorf, X. Liu "Non-mating connector for USB: A quality waterproof connection" Proc. 2013 IEEE Int. Conf. Consumer Electronics pp. 560-563 2013.

Benjestorf, Joshua S, "A New Trend in Connectivity: Sharing Content Over Multiple Channels," in IEEE Consumer Electronics Magazine, vol. 3, Issue 1, pp. 25-31, Jan. 2014.

J.S. Benjestorf, A. Morales, S. Agili, "Design and Analysis of Wireless Power Transfer for Non-Metallic USB Connector" Proc. 2020 IEEE Int. Conf. Consumer Electronics, ISBN 978-1-7281-5186-1, 2020.

* cited by examiner

POWER ACTIVATION UTILIZING REED SWITCH TECHNIQUE FOR NON-METALLIC CONNECTOR APPLICATIONS

CROSS-REFERENCE TO RELATED APPLICATIONS

This application claims the benefit of U.S. Provisional Patent Application No. 63/246,468, filed on Sep. 21, 2021, entitled "Power Activation Utilizing Reed Switch Technique for Non-Metallic Connector Applications," the entire contents of which are incorporated by reference herein.

BACKGROUND

Embodiments described herein relate generally to contactless electrical connectors, and more particularly, to techniques for preventing contactless electrical power and/or data signal transmission absent a proper connection to a corresponding receiver.

Recent advances have been made in contactless power transmission, such as for waterproofing consumer electronics. For example, U.S. Pat. No. 9,197,292, the entire contents of which are incorporated by reference herein, and which was filed by the inventor of the present application, illustrates some techniques for contactlessly transmitting power over a connector using capacitive or inductive coupling. In these types of applications, a transmission side of a connector receives power from a power supply and contactlessly conveys at least some portion of that power to a receiving side of the connector, which is physically spaced apart from the transmission side. The receiving side may use the contactlessly received power to operate a load. One example involves a non-metallic light bulb and socket, as described in U.S. patent application Ser. No. 17/875,763, the entire contents of which are incorporated by reference herein, and which was filed by the inventor of the present application.

However, in instances where the connection is broken, for example, by intentional or accidental disruption of the connector assembly or removal of the load, the transmission side may still be "live"—e.g., the circuitry may still be outputting an electromagnetic field. This can present health and safety hazards, as well as endanger nearby electronics or other components which may be damaged or unduly influenced by the field. The continuous broadcast of energy is also wasteful.

Another issue with contactless power transmission involves the precise alignment that is necessary to optimize transfer efficiency. Changing angles or distances, even in small increments, between the transmission and receiving sides of a connector can severely degrade the power transfer. Connectors where the transmission and receiving sides do not physically lock to one another are particularly susceptible to this kind of disruption.

A slightly different problem arises when considering wireless data signal exchanges. For example, USB, Lightning Bolt, HDMI, and other conventional wired connections can be used for confidential data exchanges. Corrosion-free, shock-proof, and hermetically sealed interfaces, however, tend to necessitate contactless transfer given the lack of metallic contacts. Radiation of data signals bearing confidential information should be prevented when, for example, a contactless USB drive is removed from the corresponding port, else the confidential information could be subject to unwanted discovery by third parties.

It is therefore desired to provide a contactless electrical power connector and assembly that prevents unwanted electromagnetic field generation during periods of intentional or accidental disconnection. It is further desired to provide a contactless electrical power connector and assembly that engages in contactless power transfer only when the appropriate components are properly aligned with one another. It is also desired to adapt these techniques to contactless data signal transfer to, for example, preserve confidentiality.

BRIEF SUMMARY

Briefly stated, one embodiment comprises a supply-side non-metallic contactless electrical power connector having a housing including a coupling interface configured to couple to a non-metallic load connector. The coupling interface is free of metallic material. A power supply is disposed within the housing and includes a supply input configured to electrically connect to an external power supply. A contactless electrical power transmitter is disposed within the housing and is adjacent to the coupling interface. A reed switch is disposed within the housing and is configured to enter an activated state when in proximity to a magnetic field generated by the non-metallic load connector. The reed switch is in electrical communication with the power supply and the contactless electrical power transmitter such that when the reed switch is in the activated state, the contactless electrical power transmitter is electrically connected to the power supply and is enabled to contactlessly transmit electrical power to the non-metallic load connector coupled to the coupling interface, and when the reed switch is in an inactivated state, the reed switch prevents electrical connection between the power supply and the contactless electrical power transmitter.

In one aspect, the connector further includes a contactless data communication circuit disposed within the housing and configured to at least one of transmit or receive a data signal. In another aspect, the contactless data communication circuit is in electrical communication with the reed switch such that when the reed switch is in the activated state, the contactless data communication circuit is enabled to perform the at least one of the transmission or reception of the data signal, and when the reed switch is in an inactivated state, the reed switch prevents the contactless data communication circuit from performing the at least one of the transmission or reception of the data signal. In another aspect, the reed switch, in an activated state, enables an electrical connection of the contactless data communication circuit to the power supply, and, in an inactivated state, prevents the electrical connection of the contactless data communication circuit to the power supply. In another aspect, the at least one of the transmission or reception of the data signal occurs via one of an inductive coupling, a capacitive coupling, or an optical coupling. In another aspect, the contactless data communication circuit is connected to the contactless electrical power transmitter and is configured at least one of transmit or receive the data signal via the contactless electrical power transmitter.

In yet another aspect, the coupling interface is a recess having one or more sidewalls and terminating in a closed end surface. In another aspect, the contactless electrical power transmitter is disposed within the housing adjacent to the closed end surface. In another aspect, the reed switch is disposed within the housing adjacent to the closed end surface.

In a further aspect, the reed switch is connected in series to a relay electrically connected between the power supply and the contactless electrical power transmitter.

In a still further aspect, the reed switch is a normally-open switch.

In still another aspect, the contactless electrical power transmitter is a transmitting inductor coil.

Another embodiment comprises a non-metallic contactless electrical power connector assembly that includes a supply-side connector having a supply-side housing including a supply-side coupling interface that is free of metallic material, a power supply disposed within the supply-side housing and including a supply input configured to electrically connect to an external power supply, a contactless electrical power transmitter disposed within the supply-side housing and adjacent to the supply-side coupling interface, and a reed switch disposed within the supply-side housing and in electrical communication with the power supply and the contactless electrical power transmitter. The connector assembly further includes a load-side connector having a load-side housing including a load-side coupling interface that is free of metallic material and a contactless electrical power receiver disposed within the load-side housing and adjacent to the load-side coupling interface. The contactless electrical power receiver is electrically connectable to a load. The load-side connector further includes an activation magnet disposed within the load-side housing. When the supply-side coupling interface is coupled to the load-side coupling interface and the activation magnet is in proximity to the reed switch, the contactless electrical power receiver and the contactless electrical power transmitter are aligned and physically separated from one another and the reed switch is activated such that the contactless electrical power transmitter is enabled to contactlessly transmit electrical power from the power supply to the contactless electrical power receiver. When the activation magnet is not in proximity to the reed switch, the reed switch is in an inactivated state and prevents electrical connection between the power supply and the contactless electrical power transmitter.

In one aspect, the connector assembly further includes a supply-side contactless data communication circuit disposed within the supply-side housing and a load-side contactless data communication circuit disposed within the load-side housing. The supply-side and load-side contactless data communication circuits are configured to contactlessly exchange data signals. In another aspect, the supply-side contactless data communication circuit is in electrical communication with the reed switch such that when the reed switch is in the activated state, the supply-side contactless data communication circuit is enabled to exchange the data signals with the load-side contactless data communication circuit, and when the reed switch is in the inactivated state, the reed switch prevents the supply-side contactless data communication circuit from exchanging the data signals with the load-side contactless data communication circuit. In another aspect, the reed switch, in the activated state, enables an electrical connection of the supply-side contactless data communication circuit to the power supply, and, in the inactivated state, prevents the electrical connection of the supply-side contactless data communication circuit to the power supply. In another aspect, the supply-side and load-side contactless data communication circuits respectively exchange the data signals via the contactless electrical power transmitter and the contactless electrical power receiver.

In yet another aspect, the supply-side housing has a central longitudinal axis and the load-side housing has a central longitudinal axis, and when the supply-side and load-side coupling interfaces are coupled together, the central longitudinal axes of the supply-side and load-side housings are coaxially aligned. In another aspect, the reed switch is radially offset from the longitudinal axis of the supply-side housing and the activation magnet is radially offset from the longitudinal axis of the load-side housing. In another aspect, one of the supply-side coupling interface or the load-side coupling interface includes a protruding rib and the other of the supply-side coupling interface or the load-side coupling interface includes a corresponding circumferentially extending slot configured to receive the protruding rib. The protruding rib is movable within the slot when the supply-side and load-side coupling interfaces are joined together and the load-side housing is rotated relative to the supply-side housing.

In still another aspect, the supply-side coupling interface includes a recess having one or more sidewalls and terminating in a closed end surface, the load-side coupling interface includes a cap with an end plate and one or more sidewalls extending therefrom, and when the supply-side and load-side coupling interfaces are coupled together, the cap is received within the recess. In another aspect, the contactless electrical power transmitter is disposed within the supply-side housing adjacent to the closed end surface and the contactless electrical power receiver is disposed within the load-side housing adjacent to the end plate. In another aspect, the reed switch is disposed within the supply-side housing adjacent to the closed end surface and the activation magnet is disposed within the load-side housing adjacent to the end plate.

In a still further aspect, when the supply-side coupling interface is coupled to the load-side coupling interface and the activation magnet is in proximity to the reed switch, a physical separation distance between the contactless electrical power transmitter and the contactless electrical power receiver is greater than a physical separation distance between the activation magnet and the reed switch.

In yet another aspect, the load-side housing includes a plurality of activation magnets spaced apart from one another. Alignment of any one of the plurality of activation magnets with the reed switch is dependent on a relative orientation of the load-side housing to the supply-side housing.

In still another aspect, the activation magnet is a permanent magnet.

In a further aspect, the contactless electrical power receiver is a receiving inductor coil and the contactless electrical power transmitter is a transmitting inductor coil.

Another embodiment comprises a supply-side non-metallic contactless data signal connector having a housing including a coupling interface configured to couple to a non-metallic load connector. The coupling interface is free of metallic material. A contactless data communication circuit is disposed within the housing and configured to at least one of transmit or receive a data signal. A reed switch is disposed within the housing and configured to enter an activated state when in proximity to a magnetic field generated by the non-metallic load connector. The reed switch is in electrical communication with the contactless data communication circuit such that when the reed switch is in the activated state, the contactless data communication circuit is enabled to perform the at least one of the transmission or reception of the data signal, and when the reed switch is in an inactivated state, the reed switch prevents the contactless data communication circuit from performing the at least one of the transmission or reception of the data signal.

In one aspect, the connector further includes a power supply disposed within the housing and having a supply input configured to electrically connect to an external power supply. The reed switch, in the activated state, enables an electrical connection of the contactless data communication circuit to the power supply, and, in the inactivated state, prevents the electrical connection of the contactless data communication circuit to the power supply. In another aspect, the reed switch is connected in series to a relay electrically connected between the power supply and the contactless data communication circuit.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
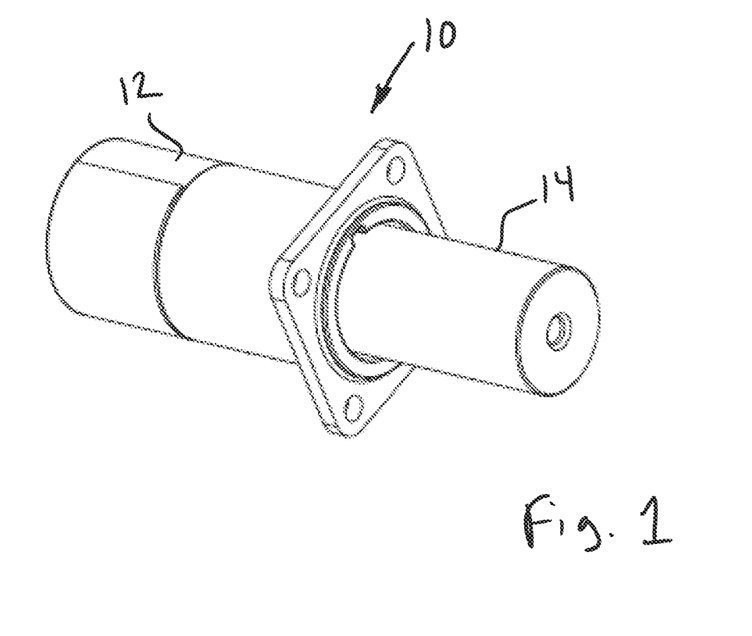
FIG. 1 is a front left side perspective view of a connector assembly in accordance with an example embodiment of the present invention.
Figure 2:
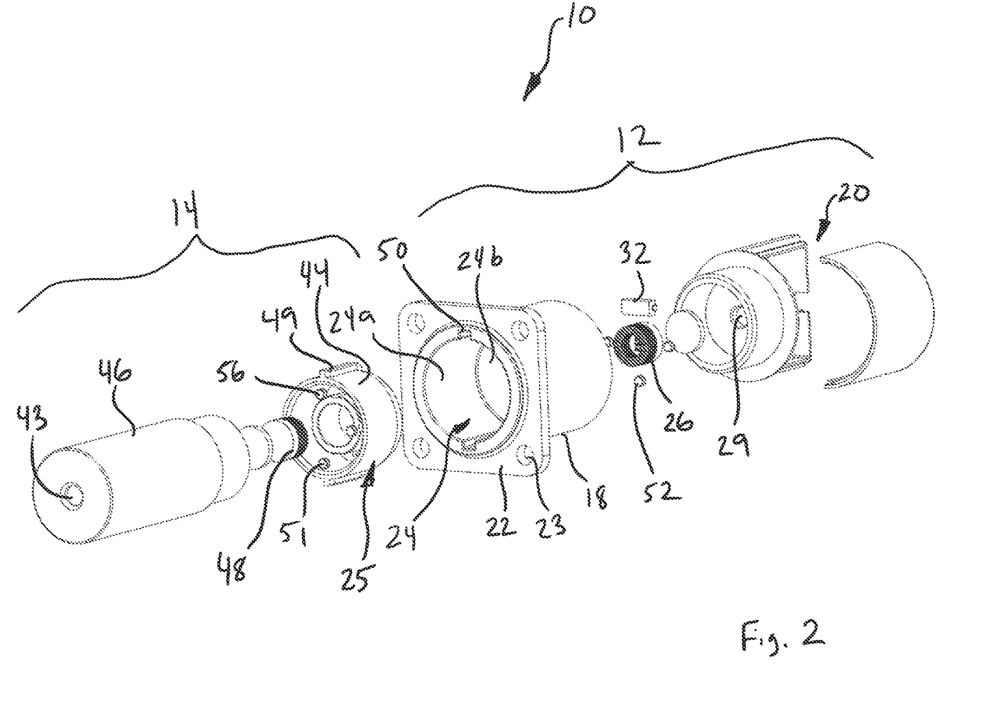
FIG. 2 is a front right side perspective exploded view of the connector assembly of FIG. 1.

Referring to FIG. 1, there is shown an example of a connector assembly 10 that includes a supply-side connector 12 and a load-side connector 14. The load-side connector 14 is shown mated or coupled to the supply-side connector 12 in FIG. 1, but is preferably designed to be removable therefrom. The supply-side connector 12 may be in the form of a socket (e.g., for a lamp, a computer port, an outlet, or the like), cable connector, or any other like structure designed for delivering power and/or exchanging data signals with another connected device. The load-side connector 14 may similarly be part of or form a connector for a load, which can be any type of device requiring power delivery and/or data signal exchange. Load examples for a connector assembly as shown and described include a light bulb and a USB drive, although many other types of devices may be used in conjunction with the connector assembly shown and described herein.

Referring to FIGS. 1-4, the supply-side connector 12 may include a supply-side housing 16. In the example shown in the drawings, the supply-side housing 16 is made primarily from two main components—a collar 18 and a base 20 that are connected to one another. However, the supply-side housing 16 may be formed by a unitary structure or can be divided among any number of desired portions that can be attached together. The collar 18 and base 20 may be press fit together at mating ends thereof and supplemented with adhesive. However, other methods of attaching the collar 18 and base 20 to one another can be used as well, such as using mechanical fasteners, screw threads, welding, combinations thereof, or the like.

The supply-side housing 16 may include a flange 22 at or near one axial end thereof, such as near an axial end of the collar 18, which can allow the supply-side connector 12 to be attached to a support structure, e.g., a wall, panel, or the like (not shown). For example, the flange 22 may include through-holes 23 configured to receive screws (not shown) or other types of fasteners to allow for attachment to the support structure. Other methods of attaching the supply-side connector 12 to a support structure, such as mechanical fasteners located elsewhere on the supply-side housing 16, adhesives, welding, or the like, may be used as well. Alternatively, in some embodiments, the supply-side connector 12 need not be attached to any support structure, such as where the supply-side connector 12 forms a terminal end of a cable or wire.

The supply-side housing 16 may include a supply-side coupling interface 24 that is configured to couple to the load-side connector 14, and particularly to a load-side coupling interface 25 thereof. The coupling interfaces 24, 25 may be primarily intended to provide connection to enable contactless power and/or data signal transfer between the two connectors 12, 14, as will be described in more detail below. However, the coupling interfaces 24, 25 may, in some embodiments, also include configurations or components designed to fix the physical positions of the supply-side connector 12 and the load-side connector 14 relative to one another. For example, the coupling of the coupling interfaces 24, 25 may involve mechanical interlock (e.g., friction fitting, threads, or the like), mechanical fasteners (e.g., clips, snap connections, screws), magnetic latches, combinations thereof, or the like. In the embodiment shown in FIGS. 1-4, the supply-side coupling interface 24 includes a recess having one or more sidewalls 24a (here a single, cylindrical sidewall) and terminating in a closed end surface 24b. The recess 24 is shown being formed in the collar 18, but the recess 24 (or any other type of supply-side coupling interface 24) can be formed anywhere on the supply-side housing 16 to account for space, orientation, and/or other design requirements. However, in other embodiments, the coupling interfaces 24, 25 may be free of any physical restraint on one another.

Notably, the supply-side coupling interface 24 may be free of metallic material to avoid the presence of exposed metallic contacts as exist in conventional connector assemblies reliant on traditional power and/or wired data signal transfer. For example, at least the sidewall(s) 24a and closed end surface 24b of the recess 24 in the example of FIGS. 1-4 may be made from plastic or other types of non-metallic, electrically insulative material.

Figure 3:
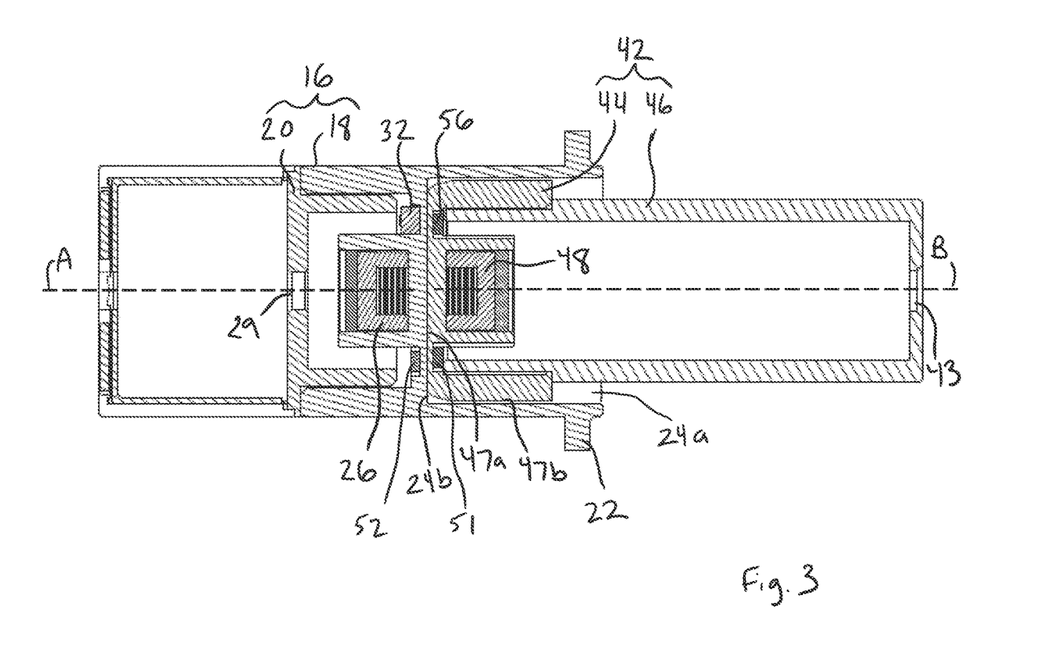
FIG. 3 is a front side elevational cross-sectional view of the connector assembly of FIG. 1.
Figure 4:
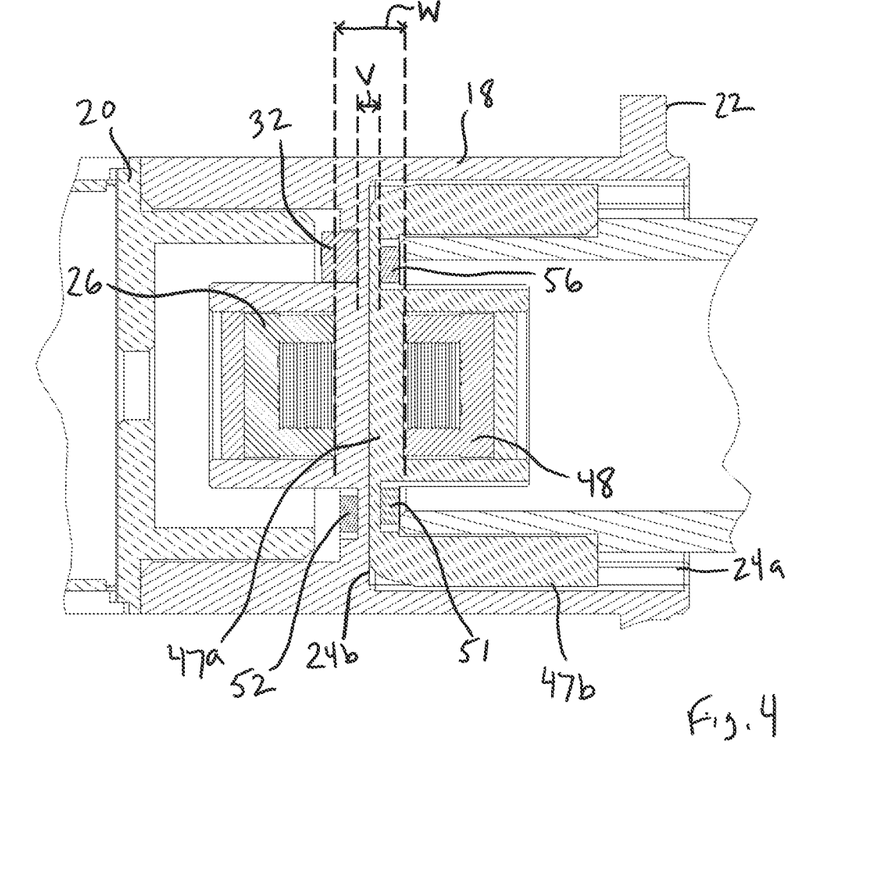
FIG. 4 is an enlarged portion of the connector assembly cross-sectional view from FIG. 3.

In embodiments for contactlessly transmitting electrical power, the supply-side connector 12 may include a contactless electrical power transmitter 26 that may be disposed within the supply-side housing 16, and more particularly, adjacent to the supply-side coupling interface 24. In the example shown in FIGS. 1-4, the contactless electrical power transmitter 26 is disposed adjacent to the closed end surface 24b of the recess 24. For example, as shown in FIGS. 3-4, the contactless electrical power transmitter 26 may abut the closed end surface 24b on a side opposite to the recess 24. However, the contactless electrical power transmitter 26, or portions thereof, may be disposed anywhere in the supply-side housing 16 as necessary to meet particular sizing or shape needs and to facilitate the contactless transmission of electrical power. The contactless electrical power transmitter 26 may be directly or indirectly secured to the closed end surface 24b on a side opposite to the recess 24 and/or other components of the supply-side housing 16 through friction fit, mechanical fasteners, adhesives, or the like. In the embodiment shown, the contactless electrical power transmitter 26 is a transmitting inductor coil, such as part number 760308105214 available from WURTH ELEKTRONIK. Additionally or alternatively, other types and styles of inductor coils may be used as well. Still further, the contactless electrical power transmitter 26 may instead comprise a capacitive plate, a combination of an inductor coil and a capacitive plate, or the like.

A power supply 28 (see e.g., FIG. 5) may be disposed within the supply-side housing 16 and may include a supply input 30 that is configured to electrically connect to an external power supply (not shown). The external power supply may be a set of electrical wires or a power cable or cord with a plug for insertion into a power outlet or other mains power supply source (not shown). However, other external power supplies may be provided in the alternative, which themselves generate or receive AC or DC electrical signals that may be transferred to the power supply 28 via the supply input 30. In some embodiments, the supply input 30 may be a terminal block with screws, clamps, or other fasteners (not shown) for retaining exposed wire ends (not shown) from the external power supply. Wires may enter the supply-side housing 16, for example, via an opening 29 in the supply-side housing 16. In such embodiments, it may be beneficial to provide a seal (not shown) at the opening 29. For example, in an underwater connector assembly, a seal may be used to prevent ingress of water into the supply-side housing 16 through the opening 29 when the supply-side housing 16 is submerged and the external power supply is connected therethrough. The supply-side housing 16 may also be designed to have an interior seal in place of or supplementing a seal directly at the opening 29. However, the supply input 30 may take other forms as well, such as wiring, a harness, battery slots, or the like.

Figure 5:
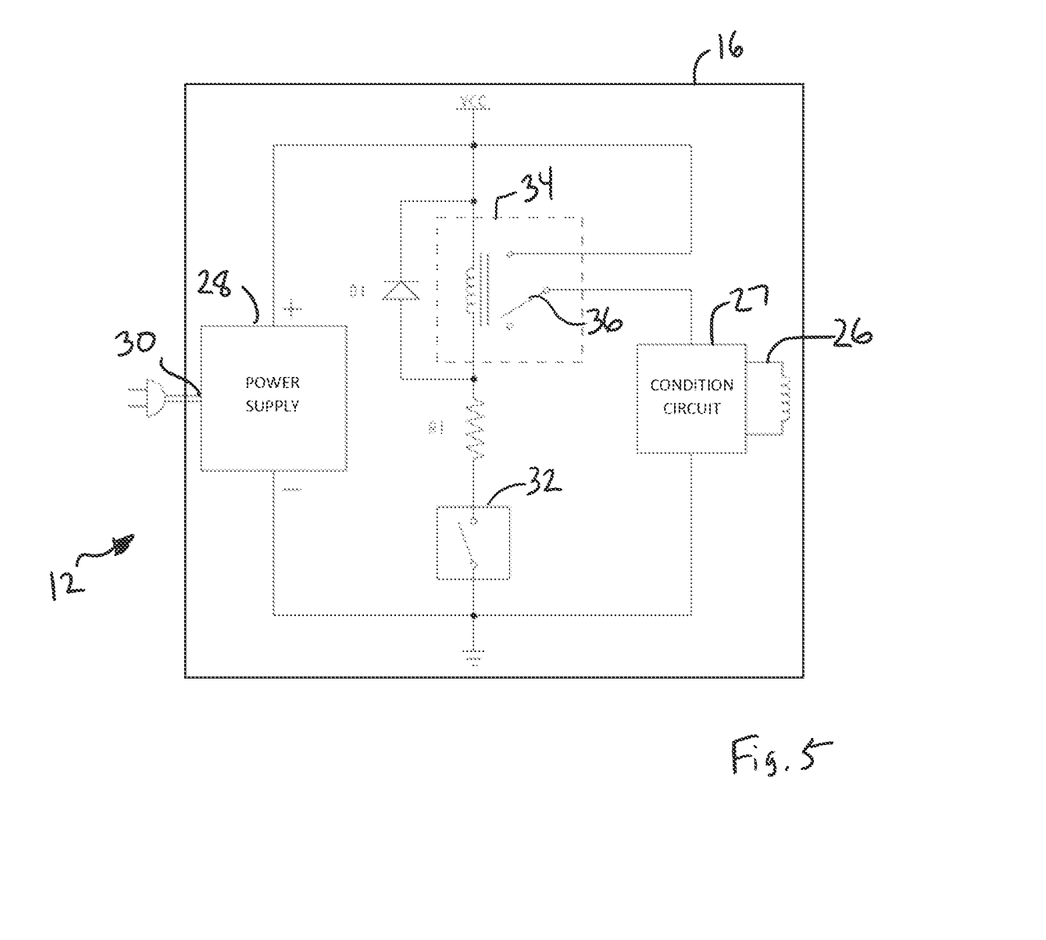
FIG. 5 is a schematic diagram of a first example circuit for use in a supply-side connector of the connector assembly of FIG. 1.

The power supply 28 may take the simple form of wires designed to move electrical power received from the external power supply toward the contactless electrical power transmitter 26. In other instances, the power supply 28 may require additional electronic components for conditioning the received electrical signal, such as rectification, voltage leveling, combinations thereof, or the like. For example, where the power supply 28 provides electrical power for other components (not shown) of the supply-side connector 12, the power supply 28 may include the necessary electronics to prepare the electrical signal to the appropriate condition for those components. In some embodiments, portions of the power supply 28 may actually be located external to the supply-side housing 16, if desired. The power supply 28 may even, in some embodiments, include a controller or processor responsible for distributing power to appropriate components.

The contactless electrical power transmitter 26 may be connected to a conditioning circuit 27 that receives power from the power supply 28. The conditioning circuit 27 may include a power converter (not shown) for changing the voltage level of the received electrical signal. If the external power supply or the power supply 28 in the housing provides mains power at 120 or 240 VAC, the power converter of the conditioning circuit 27 may step that voltage down to, for example, 5 VAC for operating certain loads, although other voltage levels can be used depending on the required operating conditions. Other components may be used as well in the conditioning circuit 27, such as a frequency converter (not shown). Using a mains supply as the example again, it may be desirable to have the contactless electrical power transmitter 26 operate at a frequency different from the 50 or 60 Hz supplied by the mains. The conditioning circuit 27 may be arranged on one or more printed circuit boards (not shown) secured to or within the supply-side housing 16, or may be directly formed or mounted to the supply-side housing 16, or the like. The conditioning circuit 27 functionality may partially or alternatively be incorporated directly by the power supply 28, if desired.

To prevent unwanted transmission by the contactless electrical power transmitter 26 when the load-side connector 14 is misaligned or absent, a reed switch 32 may be provided within the supply-side housing 16. The reed switch 32 may be configured to enter an activated state when in proximity to a magnetic field generated by the load-side connector 14, as will be explained in further detail below. The reed switch 32 may be in electrical communication with the power supply 28 and the contactless electrical power transmitter 26 (e.g., via the conditioning circuit 27 in FIG. 5) to control operation of the contactless electrical power transmitter 26. For example, when the reed switch 32 is in the activated state, the contactless electrical power transmitter 26 may be electrically connected to the power supply 28 and is able to receive power that the contactless electrical power transmitter 26 can then transmit to the load-side connector 14. In contrast, when the reed switch 32 is in an inactivated state, such as where the load-side connector 14 is disconnected from or misconnected to the supply-side connector 12, the reed switch 32 may prevent electrical connection between the power supply 28 and the contactless electrical power transmitter 26.

As can be seen in the circuit schematic in FIG. 5, the reed switch 32 may be a normally-open switch that closes under the influence of a magnetic field of specified strength. However, a normally-closed switch, or other variations of multi-pole and/or multi-throw switches may be used as well.

In the embodiment shown in FIG. 5, the reed switch 32 may control connection of the power supply 28 to the contactless electrical power transmitter 26 via a relay 34 that is electrically connected between the power supply 28 and the contactless electrical power transmitter 26. The reed switch 32 may be connected in series to the relay 34, which in the example shown includes a single pole double throw (SPDT) switch 36. When the reed switch 32 is in the inactivated state, as shown in FIG. 5, no current flows through the relay 34, and the SPDT switch 36 is in a position to prevent current from the power supply 28 from reaching the contactless electrical power transmitter 26. When the reed switch 32 is closed, current may flow through the relay 34, changing the position of the SPDT switch 36 such that now a circuit is completed between the power supply 28 and the contactless electrical power transmitter 26. While FIG. 5 shows the use of a relay 34 and SPDT switch 36, additional or alternative components may be used, as well as additional or alternative circuit configurations, to allow the reed switch 32 to control operation of the contactless electrical power transmitter 26.

Figure 6:
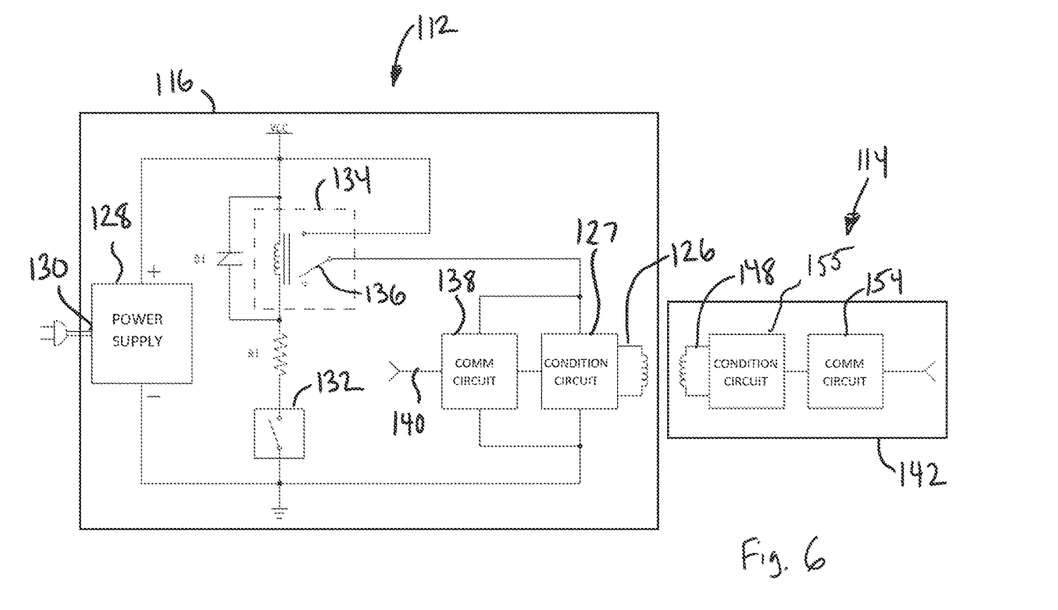
FIG. 6 is a schematic diagram of a second example circuit for use in a supply-side connector and example circuit for use in a load-side connector of the connector assembly of FIG. 1.

FIG. 6 shown an alternative example circuit schematic where a reed switch can be used to control data signal transmission/exchanges in a supply-side connector. In FIG. 6, a reed switch 132 may be disposed within the supply-side housing 116 and be in electrical communication with a contactless data communication circuit 138. The contactless data communication circuit 138 may include any circuitry necessary for transmitting and/or receiving data signals over a contactless interface, such as over an inductive coupling, a capacitive coupling, an optical coupling, combinations thereof, or the like. For example, the contactless data communication circuit 138 may include memory, multiplexers/demultiplexers, modulation circuitry, amplifiers, switches, controllers/processors, or the like (not shown). However, in alternative embodiments, portions or all of such circuitry may be provided external to the supply-side connector 112. The contactless data communication circuit 138 may be connected to a data line 140 for receiving data for transmission and/or sending out data received over the contactless channel. The data line 140 may be connected to an external data source (not shown), such as a computer, smartphone, sensor, or other computing device configured to generate and output and/or receive data. However, the data may be generated internally to the supply-side connector 112 if a processor and/or memory are housed therein.

In the example shown in FIG. 6, the contactless data communication circuit 138 is connected to and utilizes the contactless electrical power transmitter 126 (e.g., an inductor coil) to transmit (and/or receive) data, since the circuit in FIG. 6 also includes the capability for contactless electrical power transfer. However, data and power need not be output via the same interface. The contactless data communication circuit 138 may have its own inductive coil (not shown) or other inductive or capacitive interface separate from the contactless power transfer circuitry. In other embodiments, the data communication circuit 138 may include an optical transmitter (and optical receiver if data is to be received by the supply-side connector 112). In still further embodiments, the supply-side connector 112 may exclude contactless electrical power transmission altogether and only facilitate data signal transfer.

In embodiments with data communication, the reed switch 132 may, in the activated state, enable the data communication circuit 138 to perform transmission and/or reception of a data signal, and in the inactivated state, prevent the data communication circuit 138 from transmitting and/or receiving. Similar to the circuit in FIG. 5, in FIG. 6, the reed switch 132 may control connection of the power supply 128 to the contactless electrical power transmitter 126 and/or the contactless data communication circuit 138 via a relay 134 that is electrically connected between the power supply 128 and the contactless electrical power transmitter 126 and contactless data communication circuit 138. When the reed switch 132 is in the inactivated state, as shown in FIG. 6, no current flows through the relay 134, and the SPDT switch 136 is in a position to prevent current from the power supply 128 from reaching the contactless electrical power transmitter 126 and the contactless data communication circuit 138. When the reed switch 132 is closed, current may flow through the relay 134, changing the position of the SPDT switch 136 such that now a circuit is completed between the power supply 128 and the contactless electrical power transmitter 126 and the contactless data communication circuit 138. Again, while FIG. 6 shows the use of a relay 134 and SPDT switch 136, additional or alternative components may be used, as well as additional or alternative circuit configurations, to allow the reed switch 132 to control operation of the contactless electrical power transmitter 126 and/or the contactless data communication circuit 138. In some embodiments, separate reed switches 132 may be provided for each of the contactless electrical power transmitter 126 and the contactless data communication circuit 138 for independent activation. In some embodiments, the reed switch 132 may prevent transmission over data line 140 in addition to, or in place of, manipulating the circuit between the power supply 128 and the contactless data communication circuit 138.

Referring back to FIGS. 1-4, the load-side connector 14 may include a load-side housing 42. In the example shown in the drawings, the load-side housing 42 is made primarily from two main components—a cap 44 and a stem 46 that are connected to one another. However, the load-side housing 42 may be formed by a unitary structure or can be divided among any number of desired portions that can be attached together. The cap 44 and stem 46 may be press fit together at mating ends thereof and supplemented with adhesive. However, other methods of attaching the cap 44 and stem 46 to one another can be used as well, such as using mechanical fasteners, screw threads, welding, combinations thereof, or the like.

The load-side housing 42 may be integrally formed with or attached to the load, or may be connected to a cable, wire, or the like extending from the load. In the particular embodiment shown in the drawings, the load-side housing 42 may include an opening 43 formed therein to allow insertion of electrical power and/or data signal leads (e.g., via wires, cables, or the like, not shown) extending from the load, which may be coupled with a contactless electrical power receiver 48, which will be described in further detail below. In some embodiments, it may be beneficial to provide a seal (not shown) at the opening 43 of the load-side housing 42. For example, in an underwater connector assembly, a seal may be used to prevent ingress of water into the load-side housing 42 through the opening 42 when the load-side housing 42 is submerged and any leads from the load are extending therethrough. The load-side housing 42 may also be designed to have an interior seal in place of or supplementing a seal directly at the opening 43.

As described earlier, the load-side housing 42 may include a load-side coupling interface 25 configured to couple to the supply-side coupling interface 24 of the supply-side connector 12. In the example shown in FIGS. 1-4, the load-side coupling interface 25 is comprised mainly of the cap 44 of the load-side housing 42. The cap 44 may include an end plate 47a and a cylindrical sidewall 47b extending therefrom, although other shapes and configurations may be used as well, which may be influenced by spacing requirements, the shape of the supply-side coupling interface 24, or other like considerations. In this example, to properly align and secure the load-side connector 14 to the supply-side connector 12, the cap 44 may include one or more mating ribs 49 that protrude out from the cylindrical sidewall 47b. For example, the cap 44 may include two mating ribs 49 located opposite one another on an outer surface of the cylindrical sidewall 47b, with each extending generally parallel to a central longitudinal axis A of the load-side housing 42. However, more or fewer mating ribs 49 may be provided, and the mating ribs 49 may have different shapes, orientations, and/or configurations. The recess 24 in the supply-side housing 16 is shown, in this example, as having complementary slots 50 formed in the sidewall 24a thereof, which extend generally parallel to a central longitudinal axis B of the supply-side housing 16. In this example, coupling of the supply-side coupling interface 24 to the load-side coupling interface 25 involves receiving the cap 44 in the recess 24, with the mating ribs 49 being received in the slots 50.

A supplemental alignment technique is also shown in the example of FIGS. 1-4. At least one magnet 51 may be provided in the load-side housing 42 and at least one corresponding magnet 52 may be provided in the supply-side housing 16. The magnets 51, 52 may aid alignment by attracting one another such that the supply-side housing 16 and the load-side housing 42 achieve a desired orientation with respect to one another. The magnets 51, 52 may also serve to hold the supply-side housing 16 and the load-side housing 42 in place against accidental disconnection. However, as mentioned earlier, different methods for securing and aligning the two housings 16, 42 may be used in keeping with the spirit of the invention. While shown in cooperation with the mating ribs 49 and slots 50, the magnets 51, 52 may be the sole manner of alignment/securement of the housings 16, 42, or used in conjunction with other methods. In the embodiment shown, when the coupling interfaces 24, 25 are coupled together, the central longitudinal axes A, B of the load-side housing 42 and the supply-side housing 16 may be coaxially aligned, although other alignments may be made as well without departing from the spirit of the invention.

Notably, the load-side coupling interface 25 may be free of metallic material to avoid the presence of exposed metallic contacts as exist in conventional connector assemblies reliant on traditional power and/or wired data signal transfer. For example, at least the end plate 47a and sidewall(s) 47b of the cap 44 in the example of FIGS. 1-4 may be made from plastic or other types of non-metallic, electrically insulative material.

The contactless electrical power receiver 48 may be disposed within the load-side housing 42, and more particularly, adjacent to the load-side coupling interface 25. In the example shown in FIGS. 1-4, the contactless electrical power receiver 48 is disposed adjacent to the end plate 47a of the cap 44. For example, as shown in FIGS. 3-4, the contactless electrical power receiver 48 may abut an internal surface of the end plate 47a. However, the contactless electrical power receiver 48, or portions thereof, may be disposed anywhere in the load-side housing 42 as necessary to meet particular sizing or shape needs and to facilitate the contactless receipt of electrical power. The contactless electrical power receiver 48 may be directly or indirectly secured to the end plate 47a and/or other components of the load-side housing 42 through friction fit, mechanical fasteners, adhesives, or the like. In the embodiment shown, the contactless electrical power receiver 48 is a receiving inductor coil of the same make and model as the contactless electrical power transmitter 26 (e.g., part number 760308105214 available from WURTH ELEKTRONIK). However, the contactless electrical power receiver 48 may be of a different make and/or model as well. Additionally or alternatively, other types and styles of inductor coils may be used. Still further, the contactless electrical power receiver 48 may instead comprise a capacitive plate, a combination of an inductor coil and a capacitive plate, or the like. The contactless electrical power receiver 48 may be electrically connectable to the load, either directly via electrical leads or the like (not shown) or indirectly through a conditioning circuit 155, which can include, for example, a driver circuit, controller/processor, combinations thereof, or the like.

In embodiments involving data signal exchange, the load-side connector 14 may include a contactless data communication circuit, such as the contactless data communication circuit 154 shown in FIG. 6. The contactless data communication circuit 154 in the load-side connector 114 is preferably the same as, or at least compatible with the contactless data communication circuit 138 in the supply-side connector 112 so that data signals can be exchanged via inductive coupling, capacitive coupling, optical coupling, combinations thereof, or the like. As with the supply-side circuitry, the contactless data communication circuit 154 may connect to and utilize the contactless electrical power receiver 148 (e.g., an inductor coil) to receive (and/or transmit) data. However, as before, data and power need not be received via the same interface and the contactless data communication circuit 154 may have its own inductive coil (not shown) or other inductive or capacitive interface separate from the contactless power transfer circuitry. In other embodiments, the contactless data communication circuit 154 may include an optical receiver (and optical transmitter if data is to be sent to the supply-side connector 112). In still further embodiments, the load-side connector 114 may exclude contactless electrical power reception altogether and only facilitate data signal transfer.

Referring again to FIGS. 1-4, to generate the magnetic field for actuating the reed switch 32 in the supply-side connector 12, the load-side connector 14 may include one or more activation magnets 56 disposed within the load-side housing 42. The activation magnet 56 may be a permanent magnet, such as a neodymium magnet or the like. However, the activation magnet 56 may alternatively be an electromagnet or like type of magnet. In addition, one or more of the magnets 51 in the load-side housing 42 described above for securing and/or aligning the housings 16, 42 may serve as the activation magnet 56 if positioned adjacent to the reed switch 32 in a particular alignment. In embodiments having a plurality of activation magnets 56 spaced apart from one another (either as dedicated activation magnets 56 or as magnets capable of serving both activation and securing/alignment functions), alignment of any one of the magnets 51/56 with the reed switch 32 will depend on a relative orientation of the load-side housing 42 to the supply-side housing 16. In such circumstances, the coupling interfaces 24, 25 may allow for multiple acceptable relative orientations (e.g., multiple rotational alignments, multiple axial alignments, multiple radial alignments, combinations thereof, or the like), potentially necessitating an activation magnet 56 for each permitted configuration.

FIG. 4 shows an enlarged example configuration of the connector assembly 10 when the supply-side housing 16 is coupled to the load-side housing 42 and the reed switch 32 can be activated by an activation magnet 56. In this example, the reed switch 32 is radially offset from the longitudinal axis B of the supply-side housing 16, and the activation magnet 56 is similarly radially offset from the longitudinal axis A of the load-side housing 42. This accommodates the contactless electrical power transmitter 26 and the contactless electrical power receiver 48 being coaxially aligned with one another. However, the precise arrangement of the reed switch 32, activation magnet 56, contactless electrical power transmitter 26 and the contactless electrical power receiver 48 can be varied.

In this particular example, the contactless electrical power transmitter 26 and the contactless electrical power receiver 48 may be aligned and physically separated from one another by at least the end plate 47a of the cap 44 of the load-side connector 14 and the closed end surface 24b of the recess 24 of the supply-side connector 12. Thicknesses of the end plate 47a and the closed end surface 24b may be designed to put the contactless electrical power transmitter 26 and the contactless electrical power receiver 48 at an optimum distance from one another for maximizing contactless electrical power transfer. In the example shown in FIG. 4, the contactless electrical power transmitter 26 and the contactless electrical power receiver 48 are separated by a distance of about 3 mm. However, other distances may be used as well, depending on the size and other characteristics of the contactless electrical power transmitter 26 and the contactless electrical power receiver 48, space requirements, power requirements, and the like. Also in this example, a physical separation distance W between the contactless electrical power transmitter 26 and the contactless electrical power receiver 48 may be greater than a physical separation distance V between the activation magnet 56 and the reed switch 32. However, the differences can be the same or even reversed, as characteristics of the power transmission, magnet strength, and characteristics of the reed switch 32 allow.

Figure 7A:
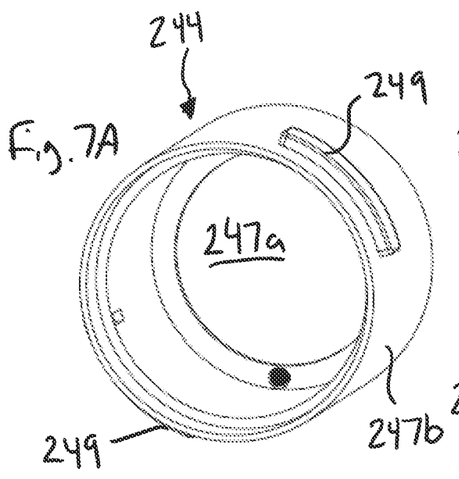
FIG. 7A is a front right side perspective view of a portion of a load-side connector of a connector assembly in accordance with another example embodiment of the present invention.
Figure 7B:
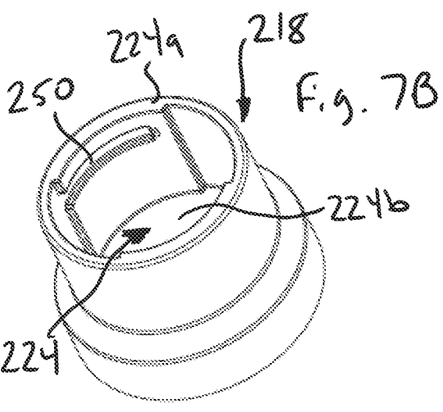
FIG. 7B is a front right side perspective view of a portion of a supply-side connector of a connector assembly in accordance with another example embodiment of the present invention.

FIGS. 7A and 7B show an alternative example of portions of a connector assembly which allow for locking of the housings together and reed switch activation through rotational action. Similar to the earlier embodiment, the cap 244 in FIG. 7A may include an end plate 247a and a cylindrical sidewall 47b. In this particular example, the mating ribs 249 located opposite one another on the outer surface of the cylindrical sidewall 247b each extend along a portion of the circumference of the cylindrical sidewall 247b. The collar 218 in FIG. 7B may also, like the earlier embodiment, include a cylindrical sidewall 224a terminating in a closed end surface 224b. In this particular example, the mating slots 250 on the interior of the sidewall 224a may each extend along a portion of the circumference of the cylindrical sidewall 224a and further include axially extending portions to allow receipt of the mating ribs 249 of the cap 244 prior to rotation of the cap 244 with respect to the collar 218. For example, the cap 244 may be inserted into the recess 224 with the mating ribs 249 aligned with the axially extending portions of the mating slots 250. Upon reaching the end of its axial travel within the recess 224, the cap 244 may then be rotated clockwise by approximately 45° with the mating ribs 249 traversing the circumferentially extending portions of the mating slots 250. The rotational aspect may provide for mechanical locking of the cap 244 to the collar 218 (and resultant locking of the connector housings to one another).

Moreover, as seen in FIG. 7A, the cap 244 may include a radially-offset positioned activation magnet 256 embedded or otherwise retained therein. A reed switch (not shown in FIG. 7B) may be similarly positioned adjacent the closed end surface 224b. As explained earlier, the cap 244 may be inserted into the collar 218 and rotated until the mating ribs 249 reach the end of the mating slots 250. At that point, the activation magnet 256 may come into alignment with the reed switch for activation. This example demonstrates a rotational action for activating the reed switch in the connector assembly.

Although shown and described in such a way that a portion of the load-side housing is received in a recess of the supply-side housing, the arrangement is not so limited, as explained above with respect to the coupling interfaces. It is conceivable, for example, that a reverse configuration, wherein the load-side housing forms a recess and receives a mating protruding portion of the supply-side housing, can be used. It is further possible that the coupling interfaces of the housings are both generally flat and can be attached by other methods. It may also be possible to include more than one contactless electrical power transmitter or receiver or contactless data communication circuit in a connector assembly.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A supply-side non-metallic contactless electrical power connector comprising:
    a housing including a coupling interface configured to couple to a non-metallic load connector, the coupling interface being free of metallic material;
    a power supply disposed within the housing and including a supply input configured to electrically connect to an external power supply;
    a contactless electrical power transmitter disposed within the housing and adjacent to the coupling interface;
    a reed switch disposed within the housing and configured to enter an activated state when in proximity to a magnetic field generated by the non-metallic load connector, the reed switch being in electrical communication with the power supply and the contactless electrical power transmitter such that:
        when the reed switch is in the activated state, the contactless electrical power transmitter is electrically connected to the power supply and is enabled to contactlessly transmit electrical power to the non-metallic load connector coupled to the coupling interface, and
        when the reed switch is in an inactivated state, the reed switch prevents electrical connection between the power supply and the contactless electrical power transmitter.

2. The connector of claim 1, further comprising a contactless data communication circuit disposed within the housing and configured to at least one of transmit or receive a data signal.

3. The connector of claim 2, wherein the contactless data communication circuit is in electrical communication with the reed switch such that
when the reed switch is in the activated state, the contactless data communication circuit is enabled to perform the at least one of the transmission or reception of the data signal, and
when the reed switch is in the inactivated state, the reed switch prevents the contactless data communication circuit from performing the at least one of the transmission or reception of the data signal.

4. The connector of claim 3, wherein the reed switch, in the activated state, enables an electrical connection of the contactless data communication circuit to the power supply, and, in the inactivated state, prevents the electrical connection of the contactless data communication circuit to the power supply.

5. The connector of claim 2, wherein the at least one of the transmission or reception of the data signal occurs via one of an inductive coupling, a capacitive coupling, or an optical coupling.

6. The connector of claim 2, wherein the contactless data communication circuit is connected to the contactless electrical power transmitter and is configured to at least one of transmit or receive the data signal via the contactless electrical power transmitter.

7. The connector of claim 1, wherein the coupling interface is a recess having one or more sidewalls and terminating in a closed end surface.

8. The connector of claim 7, wherein the contactless electrical power transmitter is disposed within the housing adjacent to the closed end surface.

9. The connector of claim 7, wherein the reed switch is disposed within the housing adjacent to the closed end surface.

10. The connector of claim 1, wherein the reed switch is connected in series to a relay electrically connected between the power supply and the contactless electrical power transmitter.

11. The connector of claim 1, wherein the reed switch is a normally-open switch.

12. The connector of claim 1, wherein the contactless electrical power transmitter is a transmitting inductor coil.

13. A non-metallic contactless electrical power connector assembly comprising:
a supply-side connector including:
a supply-side housing including a supply-side coupling interface that is free of metallic material,
a power supply disposed within the supply-side housing and including a supply input configured to electrically connect to an external power supply,
a contactless electrical power transmitter disposed within the supply-side housing and adjacent to the supply-side coupling interface,
a reed switch disposed within the supply-side housing and in electrical communication with the power supply and the contactless electrical power transmitter; and
a load-side connector including:
a load-side housing including a load-side coupling interface that is free of metallic material,
a contactless electrical power receiver disposed within the load-side housing and adjacent to the load-side coupling interface, the contactless electrical power receiver being electrically connectable to a load,
an activation magnet disposed within the load-side housing,
wherein:
when the supply-side coupling interface is coupled to the load-side coupling interface and the activation magnet is in proximity to the reed switch, the contactless electrical power receiver and the contactless electrical power transmitter are aligned and physically separated from one another and the reed switch is activated such that the contactless electrical power transmitter is enabled to contactlessly transmit electrical power from the power supply to the contactless electrical power receiver, and
when the activation magnet is not in proximity to the reed switch, the reed switch is in an inactivated state and prevents electrical connection between the power supply and the contactless electrical power transmitter.

14. The connector assembly of claim 13, further comprising a supply-side contactless data communication circuit disposed within the supply-side housing and a load-side contactless data communication circuit disposed within the load-side housing, the supply-side and load-side contactless data communication circuits being configured to contactlessly exchange data signals.

15. The connector assembly of claim 14, wherein the supply-side contactless data communication circuit is in electrical communication with the reed switch such that
when the reed switch is in the activated state, the supply-side contactless data communication circuit is enabled to exchange the data signals with the load-side contactless data communication circuit, and
when the reed switch is in the inactivated state, the reed switch prevents the supply-side contactless data communication circuit from exchanging the data signals with the load-side contactless data communication circuit.

16. The connector assembly of claim 15, wherein the reed switch, in the activated state, enables an electrical connection of the supply-side contactless data communication circuit to the power supply, and, in the inactivated state, prevents the electrical connection of the supply-side contactless data communication circuit to the power supply.

17. The connector of claim 14, wherein the supply-side and load-side contactless data communication circuits exchange the data signals via the contactless electrical power transmitter and the contactless electrical power receiver.

18. The connector assembly of claim 13, wherein the supply-side housing has a central longitudinal axis and the load-side housing has a central longitudinal axis, and when the supply-side and load-side coupling interfaces are coupled together, the central longitudinal axes of the supply-side and load-side housings are coaxially aligned.

19. The connector assembly of claim 18, wherein the reed switch is radially offset from the longitudinal axis of the supply-side housing and the activation magnet is radially offset from the longitudinal axis of the load-side housing.

20. The connector assembly of claim 19, wherein one of the supply-side coupling interface or the load-side coupling interface includes a protruding rib and the other of the supply-side coupling interface or the load-side coupling interface includes a corresponding circumferentially extending slot configured to receive the protruding rib, the protruding rib being movable within the slot when the supply-side and load-side coupling interfaces are joined together and the load-side housing is rotated relative to the supply-side housing.

21. The connector assembly of claim 13, wherein:
  the supply-side coupling interface includes a recess having one or more sidewalls and terminating in a closed end surface,
  the load-side coupling interface includes a cap with an end plate and one or more sidewalls extending therefrom, and
  when the supply-side and load-side coupling interfaces are coupled together, the cap is received within the recess.

22. The connector assembly of claim 21, wherein the contactless electrical power transmitter is disposed within the supply-side housing adjacent to the closed end surface and the contactless electrical power receiver is disposed within the load-side housing adjacent to the end plate.

23. The connector assembly of claim 21, wherein the reed switch is disposed within the supply-side housing adjacent to the closed end surface and the activation magnet is disposed within the load-side housing adjacent to the end plate.

24. The connector assembly of claim 13, wherein when the supply-side coupling interface is coupled to the load-side coupling interface and the activation magnet is in proximity to the reed switch, a physical separation distance between the contactless electrical power transmitter and the contactless electrical power receiver is greater than a physical separation distance between the activation magnet and the reed switch.

25. The connector assembly of claim 13, wherein the load-side housing includes a plurality of activation magnets spaced apart from one another, alignment of any one of the plurality of activation magnets with the reed switch being dependent on a relative orientation of the load-side housing to the supply-side housing.

26. The connector assembly of claim 13, wherein the activation magnet is a permanent magnet.

27. The connector assembly of claim 13, wherein the contactless electrical power receiver is a receiving inductor coil and the contactless electrical power transmitter is a transmitting inductor coil.

28. A supply-side non-metallic contactless data signal connector comprising:
  a housing including a coupling interface configured to couple to a non-metallic load connector, the coupling interface being free of metallic material;
  a contactless data communication circuit disposed within the housing and configured to at least one of transmit or receive a data signal;
  a reed switch disposed within the housing and configured to enter an activated state when in proximity to a magnetic field generated by the non-metallic load connector, the reed switch being in electrical communication with the contactless data communication circuit such that:
    when the reed switch is in the activated state, the contactless data communication circuit is enabled to perform the at least one of the transmission or reception of the data signal, and
    when the reed switch is in an inactivated state, the reed switch prevents the contactless data communication circuit from performing the at least one of the transmission or reception of the data signal.

29. The connector of claim 28, further comprising a power supply disposed within the housing and including a supply input configured to electrically connect to an external power supply, wherein the reed switch, in the activated state, enables an electrical connection of the contactless data communication circuit to the power supply, and, in the inactivated state, prevents the electrical connection of the contactless data communication circuit to the power supply.

30. The connector of claim 29, wherein the reed switch is connected in series to a relay electrically connected between the power supply and the contactless data communication circuit.

* * * * *